United States Patent

Randazzo et al.

(10) Patent No.: US 11,840,977 B2
(45) Date of Patent: Dec. 12, 2023

(54) METHOD OF CONTROLLING FUEL INJECTION AFTER CRANKING

(71) Applicant: BORGWARNER LUXEMBOURG AUTOMOTIVE SYSTEMS SA, Bascharage (LU)

(72) Inventors: Stephane Randazzo, Fameck (FR); Marc Passemard, Niederkorn (LU); Oguz Iscimen, Bertrange (LU)

(73) Assignee: BORGWARNER LUXEMBOURG OPERATIONS SARL, Hautcharage (LU)

(*) Notice: Subject to any disclaimer, the term of this patent is extended or adjusted under 35 U.S.C. 154(b) by 0 days.

(21) Appl. No.: 17/800,007

(22) PCT Filed: Feb. 18, 2021

(86) PCT No.: PCT/EP2021/054034
§ 371 (c)(1),
(2) Date: Aug. 16, 2022

(87) PCT Pub. No.: WO2021/165401
PCT Pub. Date: Aug. 26, 2021

(65) Prior Publication Data
US 2023/0075254 A1  Mar. 9, 2023

(30) Foreign Application Priority Data
Feb. 20, 2020 (GB) .................................. 2002403

(51) Int. Cl.
F02D 41/40 (2006.01)
F02D 41/06 (2006.01)
(52) U.S. Cl.
CPC ......... F02D 41/401 (2013.01); F02D 41/061 (2013.01); F02D 41/062 (2013.01)

(58) Field of Classification Search
CPC ..... F02D 41/401; F02D 41/061; F02D 41/062
See application file for complete search history.

(56) References Cited

U.S. PATENT DOCUMENTS

| 4,875,452 A * | 10/1989 | Hara ..................... F02D 41/345 123/488 |
| 7,373,928 B2 * | 5/2008 | Thomas ................ F02D 41/402 123/299 |
| 2017/0152805 A1 * | 6/2017 | Schenk ................. F02D 41/402 |
| 2018/0080358 A1 * | 3/2018 | Ulstad ...................... F01N 9/002 |

FOREIGN PATENT DOCUMENTS

GB      2446691 A    8/2008

OTHER PUBLICATIONS

International Search Report for PCT/EP2021/054034 dated Jun. 2, 2021, 2 pages.

* cited by examiner

Primary Examiner — Sizo B Vilakazi
(74) Attorney, Agent, or Firm — WARNER NORCROSS + JUDD LLP

(57) ABSTRACT

A method of controlling fuel injection subsequent to engine start, comprises:
a) at, or after synchronization, in respect of a potential upcoming firing or injection event for a particular cylinder, determining or selecting a first injection profile;
b) determining if there is sufficient time for the first injection profile to be implemented; and
c) if so, implementing the said first injection profile with respect to said event.

7 Claims, 1 Drawing Sheet

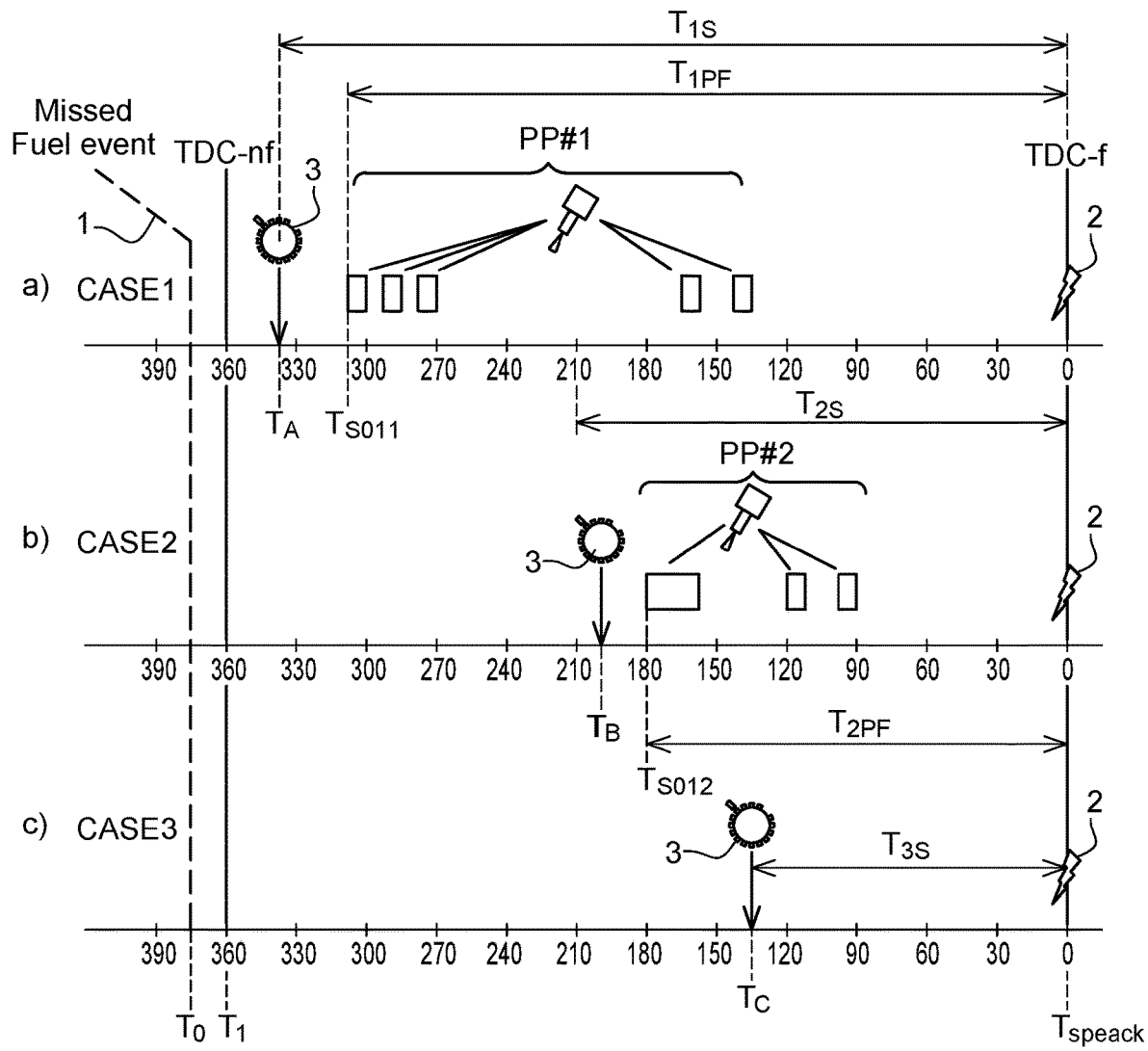

METHOD OF CONTROLLING FUEL INJECTION AFTER CRANKING

CROSS-REFERENCE TO RELATED APPLICATIONS

This application is the U.S. National Stage of International Application No. PCT/EP2021/054034 filed on 18 Feb. 2021, which claims priority to and all advantages of United Kingdom Application No. 2002403.0 filed on 20 Feb. 2020, the contents of which are incorporated herein by reference.

TECHNICAL FIELD

This relates to controlling fuel injection in an internal combustion engine shortly after start i.e. after cranking.

BACKGROUND OF THE INVENTION

When controlling fuel injection into the combustion chamber of internal combustion engines, the fuel quantity for an injection cycles and other injection parameters, is computed at a time far in advance, compared to the start of the injection or spark. So far in advance in terms of the actual defined crankshaft angular position (378° ca before firing TDC). Other injection parameters that need to be calculated in advance are the split and/or timing of multiple injections in a single injection cycle (e.g. where there are e.g. post or pre-injections in Diesel), as well as a main injection. The parameters may be considered as an injection profile to be applied for a potential upcoming ignition event. The advance timepoint when injection parameters of an injection profile to be applied are determined, is often referred to as "the fuel logic execution position".

There is a problem which occurs during the cranking phase. When the engine is driven by the starter (motor), the ECU needs to perform synchronization; this includes the ECU needing to determine the engine angular position, and then start the synchronous tasks (task that are executed at a defined angular position like the fuel logic).

In case where synchronization is achieved few degrees crank after the fuel logic execution position, (which can also be referred to as the fueling/injection profile determination position), in respect of injection in a particular (upcoming cylinder) the injection won't be programmed for the that cylinder. As a result, the engine will need more time to start.

It is an object of the invention to overcome this problem.

SUMMARY OF THE INVENTION

In one aspect is provided A method of controlling fuel injection subsequent to engine start, comprising; performing the following steps:
a) at, or after synchronization, in respect of a potential upcoming firing or injection event for a particular cylinder, determining or selecting a first injection profile;
b) determining if there is sufficient time for the first injection profile to be implemented;
c) if so implementing the said first injection profile with respect to said event.

The usual or standard timepoint of determining the injection profile for said upcoming event may have passed before synchronization.

In step b) if there is insufficient time for the first injection profile to be implemented, then the method may not apply an injection profile in respect of said event.

Step b) may comprise determining if the start of injection (SOI) for said first injection profile occurs at a time point (Tsoi1) before or after the timepoint of synchronization (Tsynch).

In Step b) if there is insufficient time for the first injection profile to be implemented, the additional steps are performed of:
d) formulating or selecting a second alternative injection profile;
e) determining if there is sufficient time for the second injection profile to be implemented; and if so implement the said second injection profile with respect to said event.

If there is not sufficient time for the second injection profile to be implemented; then an injection profile in respect of said event is not applied.

Step e) comprises determining if the start of injection (SOI) for said second injection profile occurs at a time point (Tsoi2) before or after the timepoint of synchronization (Tsynch).

If there is not sufficient time for the second injection profile to be implemented; selecting one or more further injection profiles in respect of said event.

BRIEF DESCRIPTION OF THE DRAWINGS

The present invention is now described by way of example with reference to the accompanying drawings in which:

FIG. 1 illustrates example of the invention.

DESCRIPTION OF THE PREFERRED EMBODIMENTS

The problem of delaying the engine start (depending on where the synchronization was gained) is solved by executing the fuel determination event (i.e. injection profile determination event, in respect to one or more injection profiles, at or just after the synchronization and subsequently checking if it's still possible to inject; i.e. if there is sufficient time to implement the said injection profile for an upcoming potential firing/injection event.

This may take place after it is determined that the standard or normal execution event timepoint has passed before synchronization.

So at synchronization, the fuel injection quantity is determined and an injection profile determined, for a particular potential upcoming cylinder injection/firing event. The term "injection (pulse) profile" would be understood by the skilled person and would be interpreted as including one or more injections in a injection cycle (e.g. one or multiple injections), their timing, individual fuel quantities etc. This may include determining pulse profiles for application to an actuator of a fuel injector.

If there is still sufficient time remaining for this first computed injection profile to be applied i.e. implemented (e.g. before spark), then this injection profile will be used for the upcoming spark event; if not either it is decided there will be no injection for the upcoming potential spark event or it is determined if at least one other (shorter) injection profile can be implemented, the profile having a shorter duration. If so this shorted pulse profile will be used. As mentioned, if not, no injection will be applied in respect of that firing event. So essentially an injection profile is selected which will fit in the timespan available if possible.

So in an example, the following steps are taken. It is to be noted that the steps may not necessarily occur in any specific order, and some may be provided by similar or alternative steps.

Step A

Here a fuel determination event is executed at or just after the synchronization for a first (standard) injection profile, this occurs at a time at least before sparking but usually at, or a very short time after, synchronisation.

So at (or shortly after synchronization) for a particular (putative/potential upcoming combustion/firing event) in respect of a particular cylinder, a first injection profile is determined and may include parameters such as the fuel injection quantity of that cylinder (injected by a fuel injector), the timing of one or more injections for this; i.e. this may comprise one or more separate injections as is known in the art.

The fuel determination event can this be regarded as providing i.e. determining a fueling (pulse) profile PP #1 (to be applied to the fuel injector actuator) for an upcoming potential firing/combustion event.

So in summary at a time point thereafter, engine synchronization, the fuel determination event is directly executed and parameters including one or more of the fuel mass, the main injection pattern (split and timing) and backup patterns (late timing) are then computed for PP #1. This profile may be a standard or main profile that would be applied if possible.

Step B

This is a comparison step. It is determined, i.e. a decision is made (subsequent to synchronisation) as to whether it is possible to implement the planned injection event of the profile determined PP #1 (in step A) for that cylinder for the putative/potential upcoming firing/combustion even.

This may comprise determining the timespan T1s between the synchronisation event $T_{synch}$, and the firing timepoint $Tspark_e$ (or other nominal reference timepoint) in respect of an upcoming potential firing/combustion event, and the timespan T1pf between the start of the injection timepoint Tsoi1 for that determined profile (PP #1) and the firing/sparking timepoint Tspark (or other nominal timepoint). Or simply put, is the synchronization time Tsynch before the start of injection (SOI) Tsoi1 for that injection profile PP #1.

Step C

This is implemented if the latter (T1pf) for injection profile PP #1 is shorter than the former (T1s), i.e. if synch (Tsynch) occurs before the SOI (T1soi) for that PP #1, —then, that fueling/pulse profile will be executed for the upcoming potential firing/combustion event.

This is illustrated in case 1 of FIG. 1 with the reference numerals designating like. So if the timepoint of Tsoi1 has not already passed at synchronization; that fueling/pulse profile will be executed for the upcoming potential firing/ combustion event.

Step D

If the (T1pf) for injection profile PP #1 is not shorter than the former (T1s), i.e. if Tsynch is after Tsoi1 (the SOI for PP #1), then it is decided that either there will be no injection for that upcoming spark event, or there will be implemented a further fuel determination event where an alternative i.e. different/shorter fueling profile (injector pulse profile) is determined, referred to as fueling/pulse profile PP #2.

In this latter case, the processed steps of Step B will be repeated for the different pulse/fueling profile PP #2. So, determining the timespan T2s between the synchronization event tsynch, and the firing timepoint Tspark (or other nominal timepoint) in respect of an upcoming potential firing/combustion event, and the timespan T2pf between the start of the injection timepoint tsoi2 for that determined profile PP #2 and the firing timepoint Tspark (or other nominal timepoint).

Or simply put does Tsoi2 occur after synchronization, Tsynch.

If the (T2pf) is shorter than the former (T2s), in other words if Tsynch occurs before the SOI (Tsoi2) for that injection profile PP #2 then that fueling/pulse profile PP #2 will be executed for the upcoming potential firing/combustion event.

This is illustrated in case 2 of FIG. 1 with the reference numerals designating like.

If not, i.e. if the Tsynch occurs after Tsoi2, then either a further (e.g. even shorter) fueling pulse/profile will be selected and the appropriate steps repeated or there will be no fuel injection for that upcoming potential firing event (shown in case 3 in FIG. 1).

In some examples, the above steps may take place only after it is determined that the standard or normal execution event timepoint has passed before synchronization.

The invention will now be explained with reference to FIG. 1. FIG. 1 illustrates methodology and shows timelines in three cases in respect of salient events for different synchronization timelines with respect to the synchronization.

Reference numeral 1 at T0 shows the timepoint when for a spark/firing event 2 at Tspark, the fuel (determination) event would normally (in the prior art) have to be determined by. Reference numeral 3 shows the synchronization event, which occurs at Tsynch and in the three plots shown occurs at different times TA TB Tc respectively.

In the following cases, the nominal timepoint of the fuel determination event 1 for a particular fuel injection and spark event for that cylinder in an engine cycle has occurred previously, i.e., before synchronization and thus in the prior art there would be no injection in respect of particular fuel injection and spark event for that cylinder in an engine cycle.

The following cases case 1) 2) and 3) will be described with reference the cases 1) 2) and 3) of FIG. 1.

Before doing so a recap: the plots of FIG. 1 show events with respect to a cylinder against the crankshaft position (which is equivalent to time) on the x-axis in the FIGURE reference numeral 1 denotes the time the fuel determination event should have normally been calculated at time T0 and reference numeral 3 denotes the synchronization time. There is a planned sparking/firing/combustion event 2 at time Tspark which is around top dead center (TDC) and reference numeral 1 refers to a missed fuel determination event. The previous TDC (360 degrees before) at point T1 is a non-firing/sparking as it is at the top of an exhaust stroke on a 4-stroke engine.

Case 1

Plot a) of FIG. 1 shows events with crank angle (effectively timeline) in case 1. Here synchronization time Tsynch occurs at time $T_A$.

With respect to a determined main standard injection profile PP #1, this would be applied as shown with reference to the firing point Tspark or usually TDC firing. The injection pattern/profile comprises a number of main injections and after a short while a number of post injections; this is shown generally by ref numeral PP #1. There are usually no pre/main/post injection in gasoline but intake and compression injection.

Synchronization occurs at a point $T_A$ before the time Tsoi1 which is the start of the injection pattern or profile for PP #1 i.e. before the start of injection timepoint for the main (a standard) injection pattern/regime PP #1 when applied to an injector for a cylinder for an injection event. So, the profile can and is then applied in respect of the injection for the cylinder; i.e. the standard injection patter is applied to the injector for the injection event.

In other words here Tsych occurs before Tsoi1 which is the start of injection for pulse profile PP #1 when arranged for the corresponding spark time Tspark. T1s>t1pf where (Tsynch−Tspark)=T1s, and (T1soi−Tspark)=T1pf.

So here the methodology goes ahead with this planned injection which may be a standard injection pattern, or a pattern based on a fixed standard or based on a fixed protocol, depending on e.g. temperature, torque demand etc.

Case 2

In this case, synchronization Tsynch occurs after the start of injection timepoint for a standard injection pattern regime PP #1 (e.g. after point Tsoi1) at time $T_B$.

Here a further alternative fueling pulse/pulse profile is selected/determined e.g. a backup pattern, referred to as PP #2. For this it is determined if the start of injection for this backup patter PP #2, referred to as Tsoi2 when applied with respect to the firing event occurs after synchronization. If so then this backup pattern is implemented for the upcoming firing even.

In other words, Tsoi2 is after Tsych, or

T2s>t2pf where (Tsynch−Tspark)=T2s, and T2soi−Tspark)=T2pf.

So, in case 2, a backup injection pattern PP #2 is applied to the injector if the start of injection of the backup injection pattern occurs after synchronization.

Case 3.

In this case, synchronization Tsynch again occurs at Tc, after the start of injection timepoint for a standard injection pattern regime (e.g. after point Tsoi1) but also after the start of injection of the backup injection pattern (e.g. after Tsoi2), no injection occurs as it's too late to implement the backup injection pattern In other words Tsoi2 is before Tsynch, or T3s<t2pf where (Tsynch−Tspark)=T2s, and (T2soi−Tspark)=T2pf.

The method allows one to manage the first fuel injection properly even if the synchronization point is after the normal fuel event position. The advantage of this invention compared to the prior art is the fact that the starting time is usually reduced about 1 (even 2 for 4 cylinders engine) segment.

The invention claimed is:

1. A method of controlling fuel injection subsequent to engine start, comprising:
    a) before spark and at, or after synchronization, in respect of a potential upcoming firing event for a particular cylinder, determining or selecting a first injection profile for said upcoming firing event;
    b) determining if there is sufficient time for the first injection profile to be implemented before said upcoming firing event;
    c) if so, implementing the said first injection profile with respect to said upcoming firing event for combustion; and
    wherein in step b) if there is insufficient time for the first injection profile to be implemented, the method further comprises:
    d) formulating or selecting a second alternative injection profile for said upcoming firing event;
    e) determining if there is sufficient time for the second injection profile to be implemented before said upcoming firing event; and f) if so, implementing the said second injection profile with respect to said upcoming firing event for combustion.

2. A method as claimed in claim 1, wherein the nominal or standard timepoint of determining the injection profile for said upcoming event has passed before synchronization.

3. A method as claimed in claim 1, wherein in step b) if there is insufficient time for the first injection profile to be implemented, then the method does not comprise applying the first injection profile in respect of said event.

4. A method as claimed in claim 1, wherein step b) comprises determining if the start of injection (SOI) for said first injection profile occurs at a time point (Tsoi1) before or after the timepoint of synchronization (Tsynch).

5. A method as claimed in claim 1, wherein in step e) if there is insufficient time for the second injection profile to be implemented; then the method does not comprise applying the second injection profile in respect of said event.

6. A method as claimed in claim 1, wherein step e) comprises determining if the start of injection (SOI) for said second injection profile occurs at a time point (Tsoi2) before or after the timepoint of synchronization (Tsynch).

7. A method as claimed in claim 1, wherein in step e) if there is insufficient time for the second injection profile to be implemented; the method further comprises selecting one or more further injection profiles in respect of said event.

* * * * *